US010754842B2

(12) United States Patent
Bhattacharjee et al.

(10) Patent No.: US 10,754,842 B2
(45) Date of Patent: Aug. 25, 2020

(54) PREPLAYING TRANSACTIONS THAT MIX HOT AND COLD DATA

(71) Applicant: INTERNATIONAL BUSINESS MACHINES CORPORATION, Armonk, NY (US)

(72) Inventors: Bishwaranjan Bhattacharjee, Yorktown Heights, NY (US); Mustafa Canim, Ossining, NY (US); Mohammad Sadoghi Hamedani, White Plains, NY (US); Kenneth A. Ross, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 435 days.

(21) Appl. No.: 14/304,600

(22) Filed: Jun. 13, 2014

(65) Prior Publication Data
US 2015/0363455 A1 Dec. 17, 2015

(51) Int. Cl.
*G06F 16/23* (2019.01)
*G06F 9/46* (2006.01)

(52) U.S. Cl.
CPC .......... *G06F 16/2343* (2019.01); *G06F 9/466* (2013.01)

(58) Field of Classification Search
CPC ................. G06F 17/30864; G06F 9/5083
USPC ........................................................ 707/782
See application file for complete search history.

(56) References Cited

U.S. PATENT DOCUMENTS

| 6,128,771 A * | 10/2000 | Tock ......................... G06F 8/30 |
| | | 707/999.001 |
| 8,156,247 B2 | 4/2012 | McMillen |
| 8,479,055 B2 | 7/2013 | Citron et al. |
| 9,880,786 B1 * | 1/2018 | Brown .................. G06F 3/0665 |
| 2002/0067719 A1 * | 6/2002 | Shimizu .............. G06F 13/4217 |
| | | 370/389 |
| 2008/0248779 A1 | 10/2008 | Tsui et al. |
| 2009/0282043 A1 * | 11/2009 | Dharmavaram .. G06F 17/30362 |
| 2010/0325356 A1 * | 12/2010 | Ash ..................... G06F 12/0804 |
| | | 711/113 |
| 2011/0238641 A1 * | 9/2011 | Labuda ............. G06F 17/30371 |
| | | 707/703 |

(Continued)

FOREIGN PATENT DOCUMENTS

WO    WO2009022239 A2    2/2009

OTHER PUBLICATIONS

Marti Campoy, A. Perles Ivars, J.V. Busquets Mataix, Dec. 3, 2001, Computer Engineering Department, Technical University of Valencia, Spain, pp. 1-3.*

(Continued)

*Primary Examiner* — Alford W Kindred
*Assistant Examiner* — Allen S Lin
(74) *Attorney, Agent, or Firm* — Tutunjian & Bitetto, P.C.; Anthony Curro (57) ABSTRACT

Methods and systems for performing database transactions include executing a first transaction request in a preplay mode that locks the requested data with a prefetch-lock and reads one or more requested data items from storage into a main memory buffer; locking the requested data items with a read/write lock after said data items are read into the main memory buffer; and performing the requested transaction on the data items in the main memory buffer using a processor.

16 Claims, 5 Drawing Sheets

(56) References Cited

U.S. PATENT DOCUMENTS

| | | | |
|---|---|---|---|
| 2013/0066909 A1 | 3/2013 | Swamynathan et al. | |
| 2013/0132674 A1* | 5/2013 | Sundrani | G06F 12/0804 711/122 |
| 2013/0226318 A1 | 8/2013 | Procyk et al. | |
| 2014/0188947 A1* | 7/2014 | Morris | G06F 17/30557 707/812 |
| 2014/0189693 A1* | 7/2014 | Trumbull | G06F 9/466 718/101 |
| 2014/0297780 A1* | 10/2014 | Zhou | H04L 67/2847 709/216 |
| 2015/0067000 A1* | 3/2015 | Ravuna | G06F 17/30091 707/821 |
| 2015/0089102 A1* | 3/2015 | Kumar | G06F 9/4418 710/262 |
| 2015/0095307 A1* | 4/2015 | Bensberg | G06F 17/30289 707/714 |
| 2015/0120687 A1* | 4/2015 | Bhattacharjee | G06F 17/30362 707/704 |

OTHER PUBLICATIONS

Belady, L.A. "A study of replacement algorithms for a virtual-storage computer" IBM Systems Journal, vol. 5. No. 2. 1966. pp. 78-101.

Campoy, M., et al. "Static Use of Locking Caches in Multitask Preemptive Real-Time Systems" IEEE Real-Time Embedded System Workshop. Dec. 2001. pp. 1-6.

Canim, M., et al. "An Object Placement Advisor for DB2 Using Solid State Storage" vol. 2, No. 2, Aug. 2009. (12 Pages).

Canim, M., et al. "SSD Bufferpool Extensions for Database Systems" Proceedings of the VLDB Endowment, vol. 3, No. 2. Sep. 2010. pp. 1435-1446.

Do, J., et al. "Turbocharging DBMS Buffer Pool Using SSDs" Proceedings of the 2011 ACM SIGMOD International Conference on Management of Data, SIGMOD'11, Jun. 2011. (12 Pages).

Franaszek, P., et al. "Concurrency Control for High Contention Environments" ACM Transactions on Database Systems, vol. 17, No. 2, Jun. 1992. pp. 304-345.

Harrison, G. "Understanding Solid State Disk and the 11gR2 DB flash cache" Quest Sotfware. 2009. (31 Pages).

Imielinkski, T., et al. "Data Management for Mobile Computing" SIGMOD Record, vol. 22, No. 1. Mar. 1993. (6 Pages).

Johnson, T., et al. "X3: A Low Overhead High Performance Buffer Management Replacement Algorithm*" Proceedings of the 20th VLDB Conference. Sep. 1994. pp. 439-450.

Luo, G., et al. "Transaction Reordering with Application to Synchronized Scans" Proceedings of the ACM 11th International Workshop on Data Warehousing and OLAP. Oct. 2008. (7 Pages).

H-Store "http://hstore.cs.brown.edu/" Brown University, Jul. 2010. (1 Page).

* cited by examiner

PREPLAYING TRANSACTIONS THAT MIX HOT AND COLD DATA

BACKGROUND

Technical Field

The present invention relates to database management and, more particularly, to techniques for optimizing database transactions on a multi-level storage system.

Description of the Related Art

Modern secondary storage devices include magnetic hard disks (HDs) and solid state drives (SSDs). To store a fixed amount of data, magnetic disks are the most cost-effective option. However, because input/output (I/O) operations induce physical disk head movements, the latency and throughput of HDs can be orders of magnitude worse than SSD, particularly for random I/O.

If the data set is too large to economically fit in solid SSDs alone, however, a given database may be split such that frequently used data resides on solid state storage, while less frequently used data resides on magnetic disks. In this setting, if multiple transactions are executed, there might be contention for requested records. This problem arises when a transaction gets a lock on an SSD record and awaits completion of an I/O request from the slow HDs, when another transaction already has the locks on other records and is waiting for the completion of the slow device's I/O transaction to access the SSD records. This causes under-utilization of the fast device because locking contention reduces the overall system performance.

Naïve approaches to solving this problem may include, for example, involve forcing transactions that are mixed between fast and slow items to always access the slow items first, before locking any fast items. However, this approach has several drawbacks. First, it is unclear from the start of a transaction exactly what items will be needed. Some logic may specify, for example, that an item is needed only some of the time. Second, it may not be clear to the transaction which items are fast and which are slow, particularly if caching to the SSD is performed dynamically.

An alternative is to abort mixed calls in favor of purely SSD calls, but this incurs the overhead of aborting and restarting transactions, and furthermore risks starvation of mixed transactions when there are many SSD-only transactions being performed.

SUMMARY

A method for performing database transactions includes executing a first transaction request in a preplay mode that locks the requested data with a prefetch-lock and reads one or more requested data items from storage into a main memory buffer; locking the requested data items with a read/write lock after said data items are read into the main memory buffer; and performing the requested transaction on the data items in the main memory buffer using a processor.

A method for performing database transaction includes executing a mixed transaction request in a normal mode, locking the requested data items with a read/write lock. If a hot-only transaction request is received that includes a request for one or more items locked with a read/write lock by the mixed transaction, the method includes aborting the mixed transaction, unlocking the locked data items; executing the hot-only transaction in a normal mode; executing the mixed transaction in a preplay mode that locks the requested data with a prefetch-lock, reads one or more requested data items from storage into a main memory buffer; and performing the requested mixed transaction on the data items in the main memory buffer using a processor.

A system for performing database transactions includes a processor in communication with a main memory buffer, configured to execute transaction requests on items stored in the main memory buffer; and a preplay module configured to executing a first transaction request in a preplay mode that locks the requested data with a prefetch-lock, reads one or more requested data items from storage into the main memory buffer and that locks the requested data items with a read/write lock after said data items are read into the main memory buffer.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide for preplay of mixed transactions, having both "hot" elements stored on fast storage and "cold" elements stored on relatively slow storage, to move data elements from cold storage to a main memory buffer before performing any read/write locks. This allows purely hot transactions to continue to run while cold data elements are being called up.

Consider a motivating example of a large, online bookstore that executes transactions representing book sales to customers. Both book data and customer data are partitioned (e.g., horizontally) into two categories: hot and cold. Hot customers/books are stored in solid state drives (SSDs), while cold customers/books are stored in magnetic hard drives (HDs). This partition is performed because frequently accessed items are more likely to benefit from faster storage.

In this example, suppose that the bookstore places performance targets on transactions, with different standards for hot and cold data. For example, the bookstore may need a higher throughput and/or lower latency for transactions that involve only hot data items. At first, this seems feasible. Transactions that access disk-resident data may have to wait for disk input/output (I/O), whereas transactions that only involve hot customers and books will only access the faster SSD storage.

Figure 1:
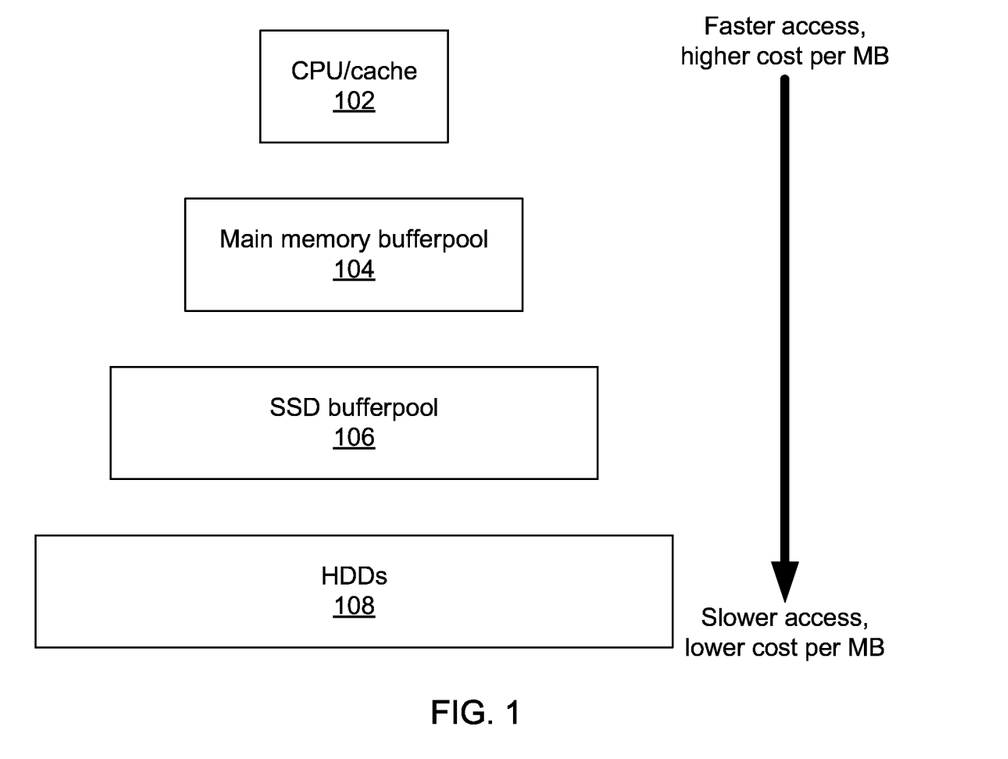
FIG. 1 is a diagram illustrating differences in cost and access speed for different kinds of memory access in accordance with the present principles.

Referring now to the drawings in which like numerals represent the same or similar elements and initially to FIG. 1, a comparison of different types of memory is shown. The diagram shows a gradient of cost-effectiveness and access speed, with the most expensive and highest-speed memory types toward the top, and the slowest, cheapest memory types toward the bottom. The CPU/cache 102 has the fastest memory, but also the most expensive, and is generally able to hold only information that is immediately relevant to the CPU's calculations. A main memory bufferpool 104 is formed from, e.g., random access memory and has more available space than the cache. The bufferpool 104 has enough room to handle individual transactions and some number of pending transactions but is far too expensive to use to hold the entire database.

An SSD bufferpool 106 holds a relatively expensive and relatively fast bulk storage, holding those data items which are frequently called upon. These hot data items will represent the majority of the transactions with bulk storage, but it is expected that the database will have a large number of relatively infrequently used data items. These data items are stored on the hard disk drives, which are inexpensive but slow in comparison to the SSDs 106.

Problems arise when some transactions access both hot and cold data. For example, a transaction $T_m$ may access both hot and cold data, while a transaction $T_h$ only accesses hot data. In this example, $T_h$ includes at least one element that is included in $T_m$ as well. If $T_m$ is scheduled first and executes in a standard fashion under strict two-phase locking, acquiring and holding locks until the transaction commits, then $T_m$ will immediately acquire locks on both hot and cold items. $T_m$ then stalls while the I/O request is submitted to read the cold data. In the meantime, $T_h$ is scheduled and tries to lock a hot item that is already locked by $T_m$. $T_h$ has to wait for $T_m$ to complete. Even though $T_h$ accesses only hot data, its latency effectively includes waiting for the slow magnetic disk. If there are a significant number of mixed hot/cold transactions, the throughput of hot-only transactions could be significantly reduced.

Figure 2:
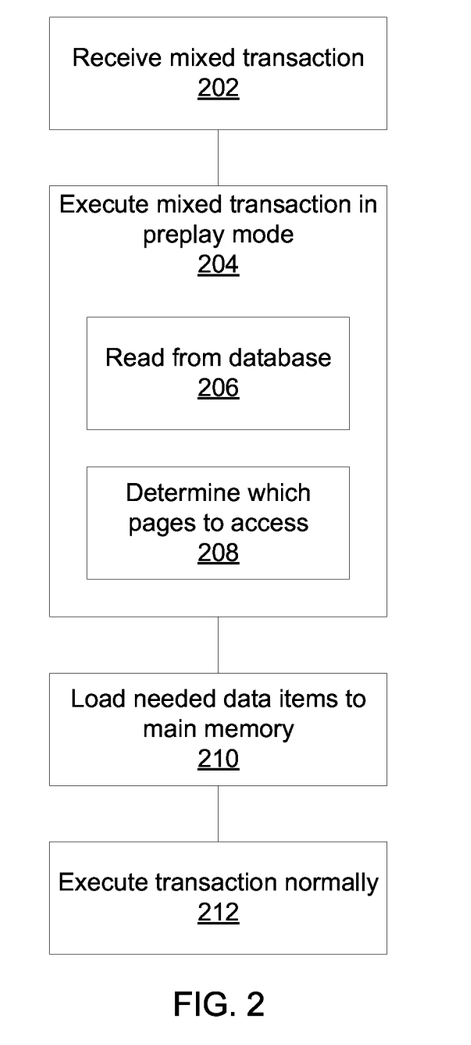
FIG. 2 is a block/flow diagram of a method for performing mixed hot/cold database transactions in accordance with the present principles.

Referring now to FIG. 2, a method for reducing the amount of time a mixed transaction locks data items is shown. Embodiments of the present principles modify incoming transactions to include a "preplay" phase. A mixed transaction, including both hot and cold data items, is received at block 202. When a transaction is scheduled, block 204 executes the transaction in a special preplay mode in which no read or write locks are obtained and no database writes are performed. The preplay mode includes reading from a database at block 206 and executing the transaction over the local copies of accessed records 208. This initial preplay phase is designed to make sure that the data needed by the transaction has been brought into the main memory buffer pool 104 in block 210. If possible, these pages can be pinned in the buffer pool 104 until the transaction completes. After the preplay phase, the local copies updated during the preplay phase are discarded and the transaction is executed as before at block 212, obtaining locks and reading and writing data. However, due to the preplay phase, no physical IO needs to be performed while holding the lock. As a result, the latency added to hot-only transactions by mixed transactions is kept short.

The pages are brought to the main memory 104 in the same manner that they would be during the normal execution of transactions. As an example, consider the following transactions which access two values, X and Y. X is located in page P1 and Y is located in page P2. During the preplay of this transaction, pages P1 and P2 are brought to the main memory as soon as the statements "Read X" and "Read Y" are processed. Once the values of X and Y are known, a third value, Z, is computed. Based on the value of Z, a page P3, holding the value W, is brought into the main memory. Hence the retrieval of the pages during the preplay phase depends on the logical conditions and computations within the transactions. As an example, consider the following pseudo-code:

```
read X;
read Y;
Z = X * Y;
if Z > 1000
    read W;
    Y = W * 30;
    write Y;
```

Preplay mode 204 is executed similar to the execution of normal transactions, except that updates over data records are preserved within the local space of transactions, such that transactions perform updates to their own local copies of the records. Once the preplay phase is finished, these local copies are discarded and never committed. This makes preplay different from the execution of normal transactions. In other words, the modifications made during the preplay phase are never written to persistent storage. The "write Y" command shown above updates a local copy that is never committed. The local copies are updated during the execution of the transaction, because once a local copy is updated it might be read again in subsequent steps of the transaction itself, but the local copy is lost once the transaction completes.

The loss of these local copies during, for example, a power outage, will not cause any problem as the preplay phase does not have any impact on the final version of the data, and the changes are discarded at the end of the preplay phase anyway. The execution of the preplay phase at block 204 is to ensure that the pages that are expected to be used during the actual transaction are present in the main memory at the time of starting the transaction processing. This will ensure that no transaction will acquire a lock on a hot item and make another transaction wait for its completion of a slow IO operation.

In the example above, the preplay mode means that $T_h$ will never have to wait for $T_m$ to complete a physical IO. If $T_h$ starts during $T_m$'s preplay phase, it runs ahead of $T_m$ on the shared data. If $T_h$ starts after $T_m$ has obtained some of $T_h$'s locks, $T_h$ waits, but the latency is lower due to the lack of a physical IO.

It is worth noting that $T_h$ could also be preplayed, as it is impossible to tell a priori which transactions access only hot items. In a database system with multiple levels of storage (e.g., ones having both SSDs 106 and HDs 108), preplay can provide a substantial increase in performance with only a small additional amount of CPU overhead.

Preplaying a transaction without locks can lead to some unexpected behavior, even if the preplay is read-only. Problems may arise when a concurrent transaction holds (or subsequently gets) a write-lock on the data and modifies it during the preplay. Not only might the preplay phase of the transaction read uncommitted data, it may read invalid data, since the write locks are ignored. To avoid such problems, the present embodiments employ a new lock mode called a prefetch-lock used only during the preplay phase of a transaction. Prefetch-locks are compatible with read locks.

When a prefetch-lock is requested on an item that is already write-locked, the preplay phase of the transaction terminates. Similarly, if a write lock is requested on an item for which a transaction T holds a prefetch-lock, the preplay phase of T is terminated and the prefetch-lock is released.

The motivation behind this policy for prefetch-locks is to avoid the pitfalls of reading invalid data, while improving performance most of the time. Since preplay is not required for correct transaction execution, terminating the preplay phase is reasonable. The point of preplay is to improve performance—holding up a transaction trying to obtain a write-lock could potentially hurt performance.

Another reason to terminate preplay when encountering write-locks is that the writing transaction is likely to bring the needed item into the buffer pool anyway. Nevertheless, there are some cases where terminating the preplay phase means that not all required data items are brought into the buffer pool.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
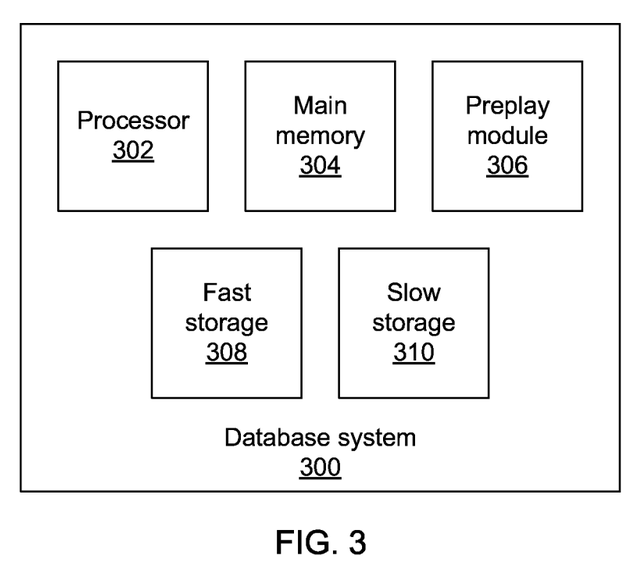
FIG. 3 is a diagram of a database system for performing mixed hot/cold database transactions in accordance with the present principles.

Referring now to FIG. 3, a database system 300 is shown. The database system 300 includes a processor 302 that processes requests for information that may be stored in main memory 304, fast storage 308, or slow storage 310. A pre-play module 306 loads information from fast storage 308 and slow storage 310 into main memory 304 before a lock is performed, such that any transactions that include only hot items will be able to complete without being blocked by mixed transactions.

It should be noted that the present principles may be applied to any kind of database environment where the latency of access to the resources by transactions is not uniform. Although the present embodiments are specifically described with respect to a local, centralized database system with different kinds of storage media, the present principles may be readily applied to other configurations. For example in a distributed database environment, it could be the case that one transaction will access a local row with a low latency (the fast storage 308), whereas another transaction accesses another row from a different machine located in a different data center with a much higher access latency (the slow storage 310). Under these circumstances preplaying the transactions could provide significant speed up.

Figure 4:
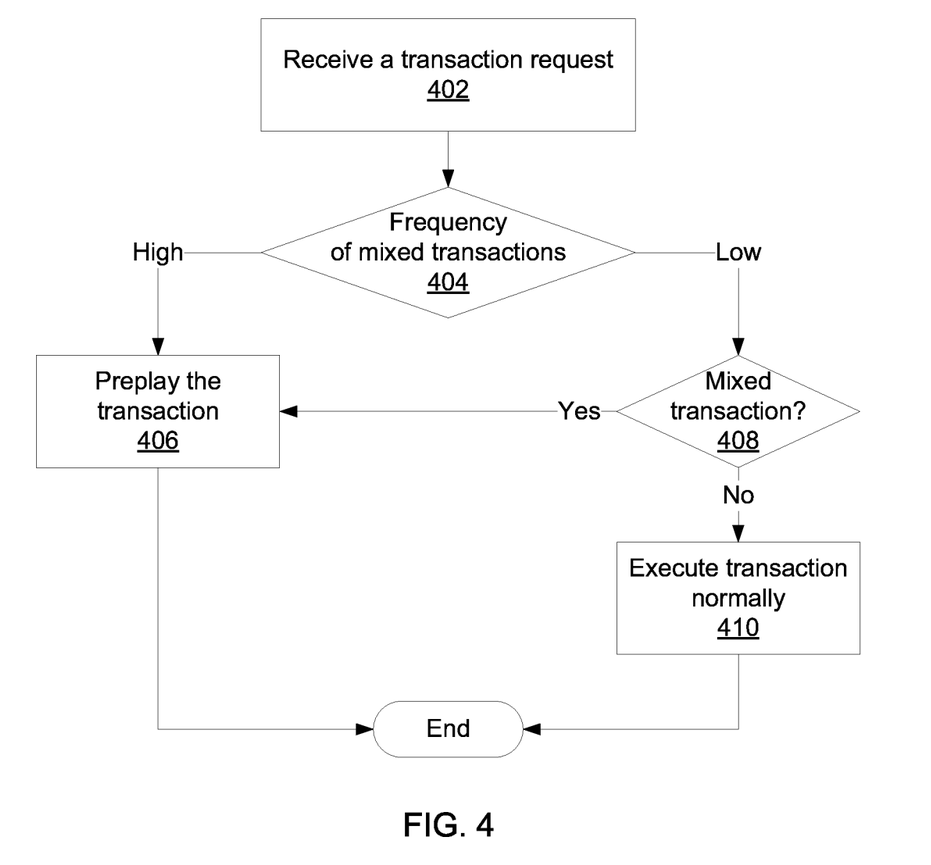
FIG. 4 is a block/flow diagram of a method for managing preplay operations in accordance with the present principles.

Referring now to FIG. 4, a first embodiment of a method for triggering a preplay is shown. A transaction request is received at block 402. At this point it is unknown whether the transaction request includes hot items, cold items, or a mixture of both. Block 404 then determines a mode of operation based on the frequency of mixed transactions. This determination can be made on a running basis or may be set according to historical information. If mixed transactions happen frequently, processing continues to block 406 which preplays the transaction regardless of whether it is mixed. If the frequency of mixed transactions is lower, block 408 determines whether the particular transaction is itself mixed. If it is mixed, block 406 preplays the transaction. If not, block 410 executes the transaction normally, without a preplay phase.

The distinction between high-frequency and low-frequency contexts is helpful because the preplay has an overhead. If mixed transactions are frequent, then the benefits of checking first whether the transaction is mixed are outweighed by the cost of making that check—if the transaction will often need to be preplayed anyway, there is little benefit to checking whether the preplay is actually needed.

Figure 5:
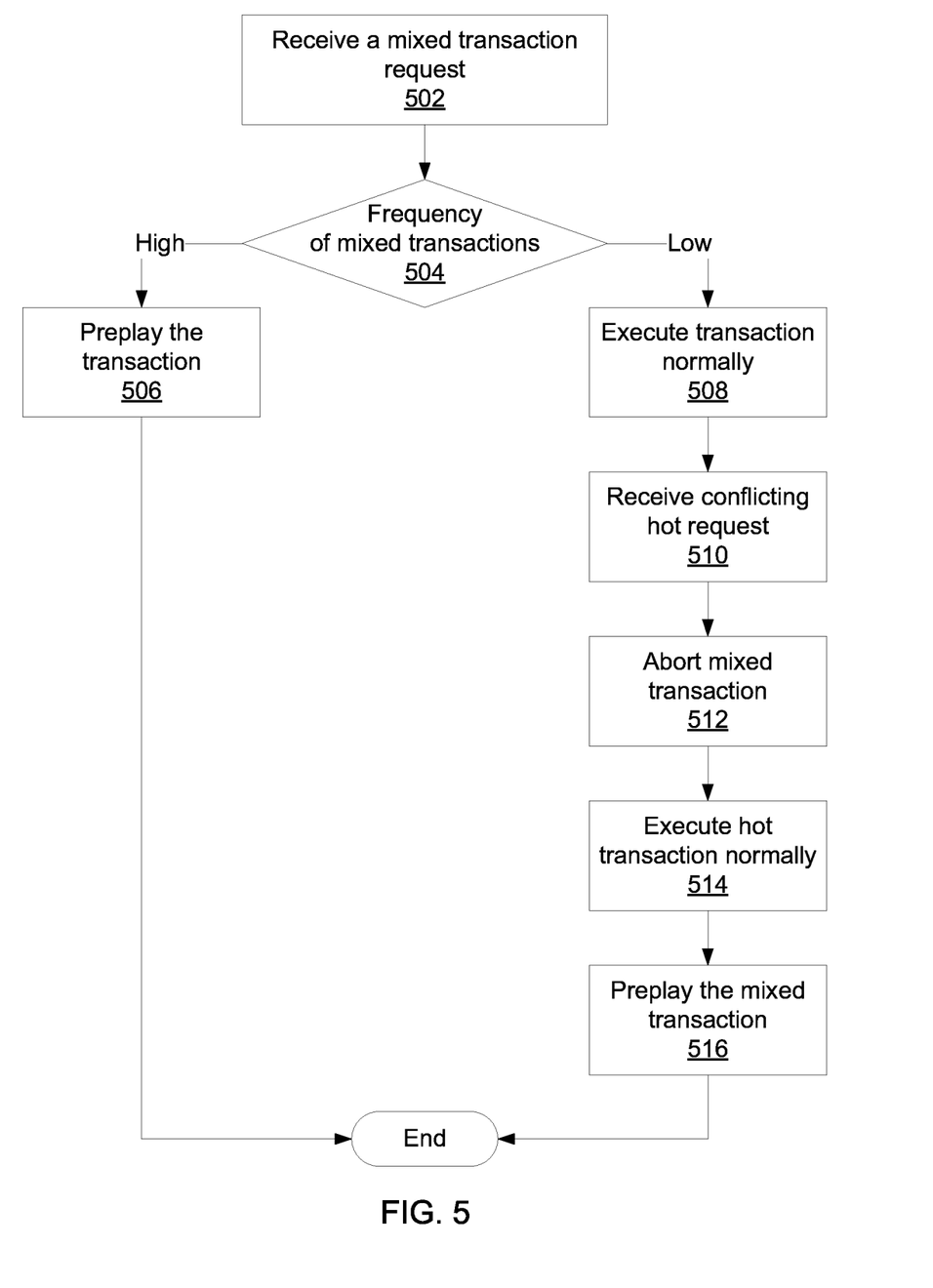
FIG. 5 is a block/flow diagram of a method for managing preplay operations in accordance with the present principles.

Referring now to FIG. 5, an alternative embodiment of a method for triggering a preplay is shown. As above, a transaction is received in block 502. Consideration is limited in this case to the receipt of mixed transactions, because hot- or cold-only transactions are all treated the same. Again, based on the frequency of mixed transactions, block 504 determines a mode of operation. If mixed transactions are frequent, block 506 preplays all transactions, regardless of their actual status.

If mixed transactions are infrequent, block 508 executes the mixed transaction normally. During the execution of the mixed transaction, a hot request is received at block 510 that includes a call for one or more items requested by the mixed transaction. Block 512 then aborts the mixed transaction, freeing the lock on the requested hot data items. Block 514 executes the hot transaction normally, while block 516 begins a preplay phase for the mixed transaction. The preplay phase can run concurrently with the hot transaction. The embodiment of FIG. 5 reduces the overhead of preplay, but will still suffer from the overhead of aborted transactions if the conflict happens too frequently.

Some consideration may be given to preventing a transaction from performing a preplay while resources are being updated by another transaction. For example, if a hot-only transaction has a read lock on a resource X, then a mixed transaction may start its pre-play phase. However, if the hot transaction has a write lock on X, the mixed transaction may abort preplay and begin again in a normal mode, waiting for the hot transaction to complete before getting locks on X. This may be approached more generally as having the mixed transaction abort preplay if it requests an item that is write locked by any other transaction. This prevents the resource from changing after the mixed transaction has preplayed it, which might result in the mixed transaction producing stale results. Additionally, the mixed transaction may call incorrect pages from the disk based on the old values, which is a waste of resources.

Having described preferred embodiments of a system and method for preplaying transactions that mix hot and cold data (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for performing database transactions, comprising:

determining that a first transaction request is a mixed transaction request that includes a request for a data item in a first storage device and a request for a data item in a second storage device, where input/output access to the second storage device is faster than input/output access to the first storage device;

executing the first transaction request in a preplay mode responsive to the determination that the first transaction request is a mixed transaction request, wherein the preplay mode requests a prefetch-lock on the requested data items in the first and second storage devices and reads the requested data items into a main memory buffer to make respective local copies, wherein the prefetch-lock is released responsive to a determination that one or more of the requested data items has a write lock requested, and wherein the prefetch-lock is released upon termination of the preplay mode;

performing one or more operations on the local copies of the requested data items in the main memory buffer, during the preplay mode, to read into the main memory buffer at least one additional data item needed to execute the first transaction request;

terminating the preplay mode;

locking the requested data items with a read or write lock for the first transaction request, after the requested data items are read into the main memory buffer, and after the prefetch-lock is released;

performing the first transaction request on the data items in the main memory buffer using a processor; and discarding the local copies of the requested data items and the at least one additional item, without writing changes to values of the local copies to the first and second storage devices.

2. The method of claim 1, wherein the first storage device comprises hard disk drive storage and wherein the second storage device comprises solid-state drive storage.

3. The method of claim 1, wherein the first storage is accessed via a link having a higher latency than a link used to access the second storage.

4. The method of claim 1, further comprising executing a second transaction request during execution of the first transaction request, wherein the second transaction comprises a request for items in the second storage device.

5. The method of claim 4, wherein the second transaction is executed without interrupting execution of the first request.

6. The method of claim 1, wherein executing a first transaction request in a preplay mode comprises determining a set of pages to access by evaluating at least one condition.

7. The method of claim 1, wherein there are no inputs or outputs to the requested data items in storage during said locking.

8. The method of claim 1, wherein discarding the local copies is performed after the preplay mode is terminated.

9. A computer readable storage medium comprising a computer readable program for performing database transactions, wherein the computer readable program when executed on a computer causes the computer to perform the steps of:
   determining that a first transaction request is a mixed transaction request that includes a request for data items in a first storage device and a request for data items in a second storage device, where input/output access to the second storage device is faster than input/output access to the first storage device;
   executing the first transaction request in a preplay mode responsive to the determination that the first transaction request is a mixed transaction request, wherein the preplay mode requests a prefetch-lock on the requested data items in the first and second storage devices and reads the requested data items into a main memory buffer to make respective local copies, wherein the prefetch-lock is released responsive to a determination that one or more of the requested data items has a write lock requested, and wherein the prefetch-lock is released upon termination of the preplay mode;
   performing one or more operations on the local copies of the requested data items in the main memory buffer, during the preplay mode, to read into the main memory buffer at least one additional data item needed to execute the first transaction request;
   locking the requested data items with a read or write lock for the first transaction request, after the requested data items are read into the main memory buffer, and after the prefetch-lock is released;
   performing the first transaction request on the data items in the main memory buffer using a processor; and
   discarding the local copies of the requested data items and the at least one additional item, without writing changes to values of the local copies to the first and second storage devices.

10. A system for performing database transactions, comprising:
    a first storage device that has a first input/output access speed;
    a second storage device that has a second input/output access speed that is faster than the first input/output access speed;
    a main memory buffer;
    a preplay module configured to determine that a first transaction request is a mixed transaction request that includes a request for a data item in the first storage device and a request for a data item in the second storage device; to execute the first transaction request in a preplay mode, responsive to the determination that the first transaction request is a mixed transaction request; to request a prefetch-lock on the requested data in the first and second storage devices, and to read the requested data items into the main memory buffer to make respective local copies, in the preplay mode; to release the prefetch-lock responsive to a determination that one or more of the requested data items has a write lock requested; to release the prefetch-lock upon termination of the preplay mode; to perform one or more operations on the local copies of the requested data items in the main memory buffer, during the preplay mode, thereby reading into the main memory buffer at least one additional data item needed to execute the first transaction request; to terminate the preplay mode; and to discard the local copies of the requested data items and the at least one additional data item, without writing changes to values of the local copies to the first and second storage devices; and
    a processor, in communication with the main memory buffer, configured to lock the requested data items with a read or write lock for the first transaction request, after the requested data items are read into the main memory buffer and after the prefetch-lock is released, and to perform the first transaction request on the requested data items in the main memory buffer.

11. The system of claim 10, wherein the first storage device comprises hard disk drive storage and wherein the second storage device comprises solid-state drive storage.

12. The system of claim 10, wherein the first storage is accessed via a link having a higher latency than a link used to access the second storage.

13. The system of claim 10, wherein the processor is further configured to execute a second transaction request during execution of the first transaction request, wherein the second transaction comprises a request for items in the second storage device.

14. The system of claim 13, wherein the processor is configured to execute the second transaction without interrupting execution of the first request.

15. The system of claim 10, wherein the preplay module is further configured to determine a set of pages to access by evaluating at least one condition.

16. The system of claim 10, wherein there are no inputs or outputs to the requested data items in storage during said locking.

* * * * *